United States Patent
Eveker et al.

(10) Patent No.: US 12,196,528 B2
(45) Date of Patent: Jan. 14, 2025

(54) INTERCHANGEABLE SYSTEMS AND METHODS FOR LAUNCHING STORES FROM AIRCRAFT

(71) Applicant: THE BOEING COMPANY, Arlington, VA (US)

(72) Inventors: James Eveker, St. Louis, MO (US); Cory Keller, St. Charles, MO (US)

(73) Assignee: The Boeing Company, Arlington, VA (US)

(*) Notice: Subject to any disclaimer, the term of this patent is extended or adjusted under 35 U.S.C. 154(b) by 128 days.

(21) Appl. No.: 18/176,520

(22) Filed: Mar. 1, 2023

(65) Prior Publication Data
US 2024/0295381 A1 Sep. 5, 2024

(51) Int. Cl.
*F41F 3/06* (2006.01)
*B64D 7/08* (2006.01)
*F41F 3/052* (2006.01)

(52) U.S. Cl.
CPC .......... *F41F 3/06* (2013.01); *B64D 7/08* (2013.01); *F41F 3/052* (2013.01)

(58) Field of Classification Search
CPC ...... B64D 1/06; B64D 1/04; F41F 3/06; F41F 3/065; F41F 5/00
See application file for complete search history.

(56) References Cited

U.S. PATENT DOCUMENTS

| | | | | |
|---|---|---|---|---|
| 3,006,253 A * | 10/1961 | Parot | ............... | B64D 1/04 89/1.51 |
| 4,589,615 A * | 5/1986 | Walker, Jr. | ............... | B64D 1/04 244/137.4 |
| 7,610,841 B2 * | 11/2009 | Padan | ............... | B64D 37/12 89/1.8 |
| 11,332,246 B2 | 5/2022 | Keller | | |
| 11,459,102 B2 * | 10/2022 | Keller | ............... | B64D 5/00 |
| 11,505,318 B2 | 11/2022 | Keller | | |
| 2005/0204910 A1 * | 9/2005 | Padan | ............... | B64D 1/04 89/1.813 |
| 2016/0083089 A1 * | 3/2016 | Ray | ............... | F41F 3/06 244/137.4 |
| 2016/0288906 A1 * | 10/2016 | Christof | ............... | B64D 1/04 |
| 2017/0259919 A1 * | 9/2017 | Foster | ............... | G06F 3/00 |
| 2019/0277603 A1 * | 9/2019 | Livingstone | ............... | B64D 1/06 |
| 2020/0391866 A1 * | 12/2020 | Keller | ............... | B64D 1/04 |
| 2022/0363387 A1 * | 11/2022 | Keller | ............... | B64D 1/12 |
| 2023/0089584 A1 * | 3/2023 | Stangl | ............... | B64D 7/08 244/137.4 |

OTHER PUBLICATIONS

U.S. Appl. No. 17/713,600, filed Apr. 5, 2022.

* cited by examiner

*Primary Examiner* — Joshua E Freeman
(74) *Attorney, Agent, or Firm* — Joseph M. Butscher; The Small Patent Law Group LLC

(57) ABSTRACT

A launch system and method for an aircraft include a first ejector, and a second ejector. The first ejector and the second ejector are configured to cooperate to releasably retain a first store having a first length. Each of the first ejector and the second ejector is configured to releasably retain one or more second stores having a second length that differs from the first length.

20 Claims, 6 Drawing Sheets

INTERCHANGEABLE SYSTEMS AND METHODS FOR LAUNCHING STORES FROM AIRCRAFT

FIELD OF THE DISCLOSURE

Examples of the present disclosure generally relate to interchangeable systems and methods for launching stores, such as missiles, rockets, and bombs, from aircraft.

BACKGROUND OF THE DISCLOSURE

Various types of military aircraft include stores, such as air-to-air missiles, air-to-ground-missiles, rockets, bombs, and/or the like. Stores are typically secured underneath wings and/or a fuselage of an aircraft. For example, racks or rails are secured to wings and/or a fuselage. Stores are releasably coupled to the racks or rails.

However, each rack or rail is typically configured to reliably retain a particular type of store, such as having a particular length. If additional and/or different store lengths and/or quantities are to be used for a particular mission, entirely different racks or rails configured for such stores are mounted on the aircraft.

SUMMARY OF THE DISCLOSURE

A need exists for a system and a method for interchanging different stores in relation to a single launch system. Further, a need exists for an adaptable launch system and method configured to releasably retain different types of stores.

With those needs in mind, certain examples of the present disclosure provide a launch system for an aircraft. The launch system includes a first ejector, and a second ejector. The first ejector and the second ejector are configured to cooperate to releasably retain a first store having a first length. Each of the first ejector and the second ejector is configured to releasably retain a second store having a second length that is less than the first length.

In at least one example, the first ejector is configured to releasably retain one second store. The second ejector is configured to releasably retain another second store.

In at least one example, the first ejector and the second ejector are configured to allow the first store to be removed from the first ejector and the second ejector, and replaced with one or more of the second stores. The first ejector and the second ejector are further configured to allow the one or more second stores to be removed and replaced with the first store.

In at least one example, the first ejector includes a first securing interface having a first retainer and a second retainer. The second ejector includes a second securing interface having a third retainer and a fourth retainer.

In at least one example, the first store is releasably retained by the first retainer, the second retainer, the third retainer, and the fourth retainer. The second store is releasably retained by only the first retainer and the second retainer, or the third retainer and the fourth retainer.

In at least one example, the first retainer, the second retainer, the third retainer, and the fourth retainer are linearly aligned.

In at least one example, the first store includes a first coupler releasably retained by the first retainer, a second coupler releasably retained by the second retainer, a third coupler releasably retained by the third retainer, and a fourth coupler releasably retained by the fourth retainer.

In at least one example, the second store includes a first coupler releasably retained by one of the first retainer or the third retainer, and a second coupler releasably retained by one of the second retainer or the fourth retainer.

In at least one example, the launch system also includes a control unit configured to operate the first ejector and the second ejector to launch the first store and the second store. For example, the control unit is configured to operate both the first ejector and the second ejector to launch the first store. The control unit is further configured to operate one of the first ejector or the second ejector to launch the second store.

The launch system can also include a carriage configured to secure the launch system to the aircraft.

Certain examples of the present disclosure provide a launch method for an aircraft, comprising: releasably retaining a first store having a first length by a first ejector and a second ejector; and releasably retaining a second store having a second length that is less than the first length with the first ejector or the second ejector.

Certain examples of the present disclosure provide an aircraft including a launch system, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide a launch system configured to interchangeably retain different types of stores, such as stores having different lengths. The launch system is configured to receive and releasably retain different types of stores, and launch or otherwise eject such stores without re-configuring the launch system. In at least one example, a launch system and method for an aircraft enable interchanging various lengths and types of stores onto a single launch system.

Figure 1:
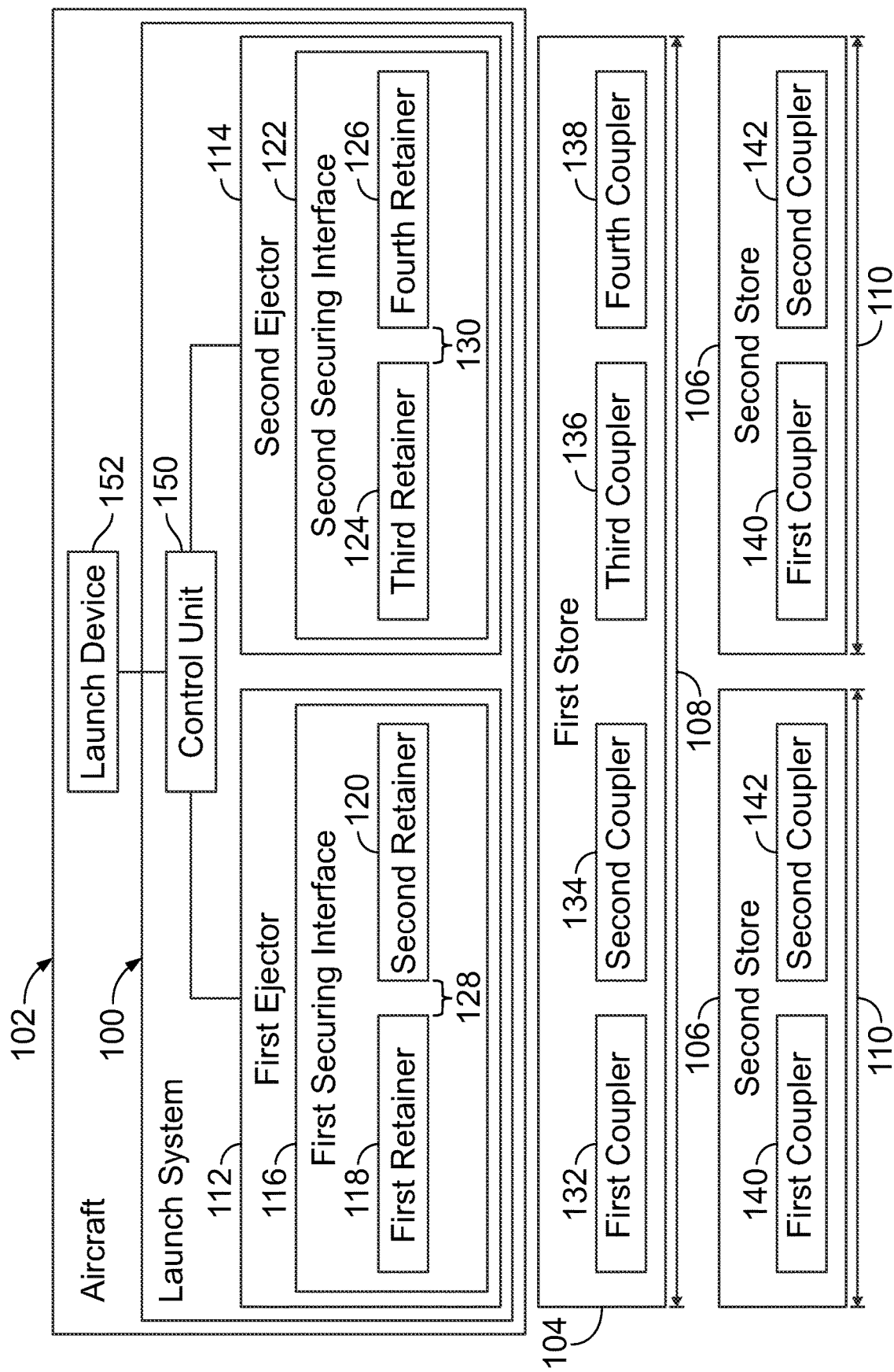
FIG. 1 illustrates a block diagram of a launch system for an aircraft, according to an example of the present disclosure.

FIG. 1 illustrates a block diagram of a launch system 100 for an aircraft 102, according to an example of the present disclosure. The aircraft 102 is a military aircraft, such as a military fighter jet, a bomber, or the like. As another example, the aircraft 102 is a helicopter. As another example, the aircraft 102 is an unmanned aerial vehicle, such as a drone.

The launch system 100 is configured to interchangeably and releasably retain different types of stores, such as air-to-air missiles, air-to-ground missiles, rockets, bombs, and/or the like. For example, a first store 104 is configured to be releasably retained by the launch system 100. The launch system 100 is also configured to releasably retain one or more second stores 106, which differ from the first store 104. The first store 104 can be removed from the launch system 100, and one or both of the second stores 106 can be secured to the launch system 100 in place of the first store 104.

In at least one example, the first store 104 differs from the second stores 106 in terms of length. In particular, the first store 104 has a first length 108, and each of the second stores 106 has a second length 110, which is shorter than the first length 108. In this manner, the first store 104 can be considered a long store, and the second stores 106 can be considered short stores. In at least one example, the second length 110 is half or approximately half (such as within 5%) the length of the first length 108. Optionally, the second length 110 can be greater or less than half the first length 108. For example, the second length 110 can be between 20-80% of the first length 108.

The launch system 100 includes a first ejector 112 and a second ejector 114. For example, the first ejector 112 is a forward ejector, and the second ejector 114 is an aft ejector, or vice versa. In at least one example, the first ejector 112 includes a first securing interface 116 having a first retainer 118 and a second retainer 120. Similarly, the second ejector 114 includes a second securing interface 122 having a third retainer 124 and a fourth retainer 126. The first ejector 112 and the second ejector 114 can be similarly configured, such that each of the first retainer 118, the second retainer 120, the third retainer 124, and the fourth retainer 126 are of the same type and/or otherwise similarly configured.

The ejectors can be pyrotechnic, hydraulic, or pneumatic powered ejectors. Examples of the ejectors are shown and described in U.S. Pat. Nos. 11,459,102, and 11,505,318, each of which is entitled "Container Retention and Release Apparatus Having Integral Swaybrace and Retention Features." However, such are merely examples of the ejectors. Other types of ejectors can be used.

The first retainer 118 is separated from the second retainer 120 by a distance 128. Similarly, the third retainer 124 is separated from the fourth retainer 126 by a distance 130. In at least one example, the distance 128 is equal to the distance 130.

In at least one example, the first securing interface 116 is linearly aligned with the second securing interface 122. For example, the first retainer 118, the second retainer 120, the third retainer 124, and the fourth retainer 126 are all linearly aligned in relation to a common plane. In at least one example, the first retainer 118, the second retainer 120, the third retainer 124, and the fourth retainer 126 are aligned along a common straight linear path.

The first ejector 112 and the second ejector 114 are configured to releasably retain the first store 104. In at least one example, the first store 104 includes a first coupler 132, a second coupler 134, a third coupler 136, and a fourth coupler 138, which are linearly aligned with one another. The first coupler 132 is configured to be releasably retained by the first retainer 118. The second coupler 134 is configured to be releasably retained by the second retainer 120. The third coupler 136 is configured to be releasably retained by the third retainer 124, and the fourth coupler is configured to be releasably retained by the fourth retainer 126. As such, the first store 104 is configured to be releasably retained by both the first securing interface 116 of the first ejector 112 and the second securing interface 122 of the second ejector 114.

In contrast, each of the second stores 106 is configured to be releasably retained by only one of the first securing interface 116 of the first ejector 112 or the second securing interface 122 of the second ejector 114. For example, each of the second stores 106 includes a first coupler 140 and a second coupler 142 that is linearly aligned with the first coupler 140. The first coupler 140 is configured to be releasably retained by the first retainer 118 (or the third retainer 124), and the second coupler 142 is configured to be releasably retained by the second retainer 120 (or the fourth retainer 126). In this manner, the launch system 100 can releasably retain two second stores 106, with one second store 106 releasably retained by the first securing interface 116 of the first ejector 112, and another second store 106 releasably retained by the second securing interface 122 of the second ejector 114.

In at least one example, additional third stores can be releasably retained by single retainers. For example, third stores having lengths shorter than the length 110 can be releasably retained by each of the first retainer 118, the second retainer 120, the third retainer 124, and/or the fourth retainer 126.

In operation, the first store 104 can be interchangeably coupled to the launch system 100 with a plurality of the second stores 106. For example, a single first store 104 can be releasably secured to both the first securing interface 116 of the first ejector 112 and the second securing interface 122 of the second ejector 114. The first store 104 can then be removed from the launch system 100, and one (such as a first) second store 106 can be releasably secured to the first securing interface 116, and another (such as a second) second store 106 can be releasably secured to the second securing interface 122. Accordingly, the same launch system 100 is used to releasably retain different stores (such as the first store 104 and the second stores 106), such as having different lengths.

The couplers of the first store 104 and the second store 106 can be configured the same as one another. In at least one example, the couplers are bail lugs. In at least one other example, the couplers are retention posts. In at least one other example, the couplers are hangers. Such are examples, and the couplers can be various other features.

As described herein, the launch system 100 for the aircraft 102 includes the first ejector 112 and the second ejector 114.

The first ejector 112 and the second ejector 114 are configured to cooperate to releasably retain (that is, configured to release, such as by launching on command) the first store 104 having the first length 108. That is, a single first store 104 is releasably retained by both the first ejector 112 and the second ejector 114. Each of the first ejector 112 and the second ejector 114 is configured to releasably retain a second store 106 having a second length 110 that differs from the first length 108. That is, a second store 106 is releasably retained by only one of the first ejector 112 or the second ejector 114. In at least one example, the first ejector 112 is configured to releasably retain one second store 106 (such as the second store 106a shown in FIG. 11), and the second ejector 114 is configured to releasably retain another second store 106 (such as the second store 106b shown in FIG. 11).

The first ejector 112 and the second ejector 114 are configured to allow the first store 104 to be removed from the first ejector 112 and the second ejector 114, and replaced with one or more of the second stores 106. Further, the first ejector 112 and the second ejector 114 are configured to allow the one or more second stores 106 to be removed and replaced with the first store 104.

In at least one example, the launch system 100 also includes a control unit 150 in communication with the first ejector 112 and the second ejector 114, such as through one or more wired or wireless connections. The control unit 150 is also in communication with a launch device 152, such as within a cockpit of an aircraft. The launch device 152 can be a trigger, button, or the like, such as can be on a yoke, joystick, or the like. The launch device 152 is configured to be engaged by a pilot to launch one or more of the stores 104 or 106. For example, in response to engaging the launch device 152, the control unit 150 receives a launch signal. The control unit 150 then operates the first ejector 112 and/or the second ejector 114 to launch either the first store 104 from the launch system 100, or one or both of the second stores 106, depending on which are releasably retained by the launch system 100.

In at least one example, the control unit 150 is configured to communicate with the stores 104 and 106 to determine if the launch system 100 is carrying two second stores 106 or one first store 104. In response to receiving the launch signal from the launch device 152, the control unit 150 sends an electrical firing pulse to one or both of the first ejector 112 and/or the second ejector 114 (depending on the stores carried by the launch system 100, and the launch command as output by the launch signal). For example, in the case of a second store 106 releasably secured to one of the first ejector 112 or the second ejector 114, the control unit 150 sends an electrical pulse to the single first ejector 112 or second ejector 114, which is retaining the second store 106. In the case of a first store 104 releasably secured to both the first ejector 112 and the second ejector 114, the control unit 150 simultaneously sends electrical pulses to both the first ejector 112 and the second ejector 114.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 150 may be or include one or more processors that are configured to control operation, as described herein.

The control unit 150 is configured to execute a set of instructions that are stored in one or more data storage units or elements (such as one or more memories), in order to process data. For example, the control unit 150 may include or be coupled to one or more memories. The data storage units may also store data or other information as desired or needed. The data storage units may be in the form of an information source or a physical memory element within a processing machine.

The set of instructions may include various commands that instruct the control unit 150 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 150. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 150 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As described herein, the launch system 100 includes two ejectors, such as the first ejector 112 and the second ejector 114. The first ejector 112 and the second ejector 114 are configured to together releasably retain the first store 104, and also each of the first ejector 112 and the second ejector 114 is configured to releasably retain a second store 106. Accordingly, the launch system 100 is configured to carry a single first store 104 (for example, a long store) or two separate and distinct second stores 106 (for example, short stores). The launch system 100 allows a double quantity of second stores 106 to be carried in the space where a single first store 104 is carried.

Examples of the present disclosure provide the launch system 100 configured to interchangeably retain a single long store, such as the first store 104, or two short stores, such as the second stores 106, without re-configuring the aircraft 102 or the launch system 100 itself. The launch system 100 allows store configurations to be changed quickly without removing and replacing racks and launchers for each type of store. The launch system 100 improves overall integration of new weapons. The launch system 100 also reduces weapon drag in free flight. The launch system 100 also reduces weapons system structural weight. The launch system 100 also provides additional payload volume inside the weapons systems. The launch system 100 also provides additional weapon range performance. Further, the launch system 100 also reduces operational and maintenance costs, because multiple types of racks and launchers can be eliminated, minimized, or otherwise reduced.

Figure 2:
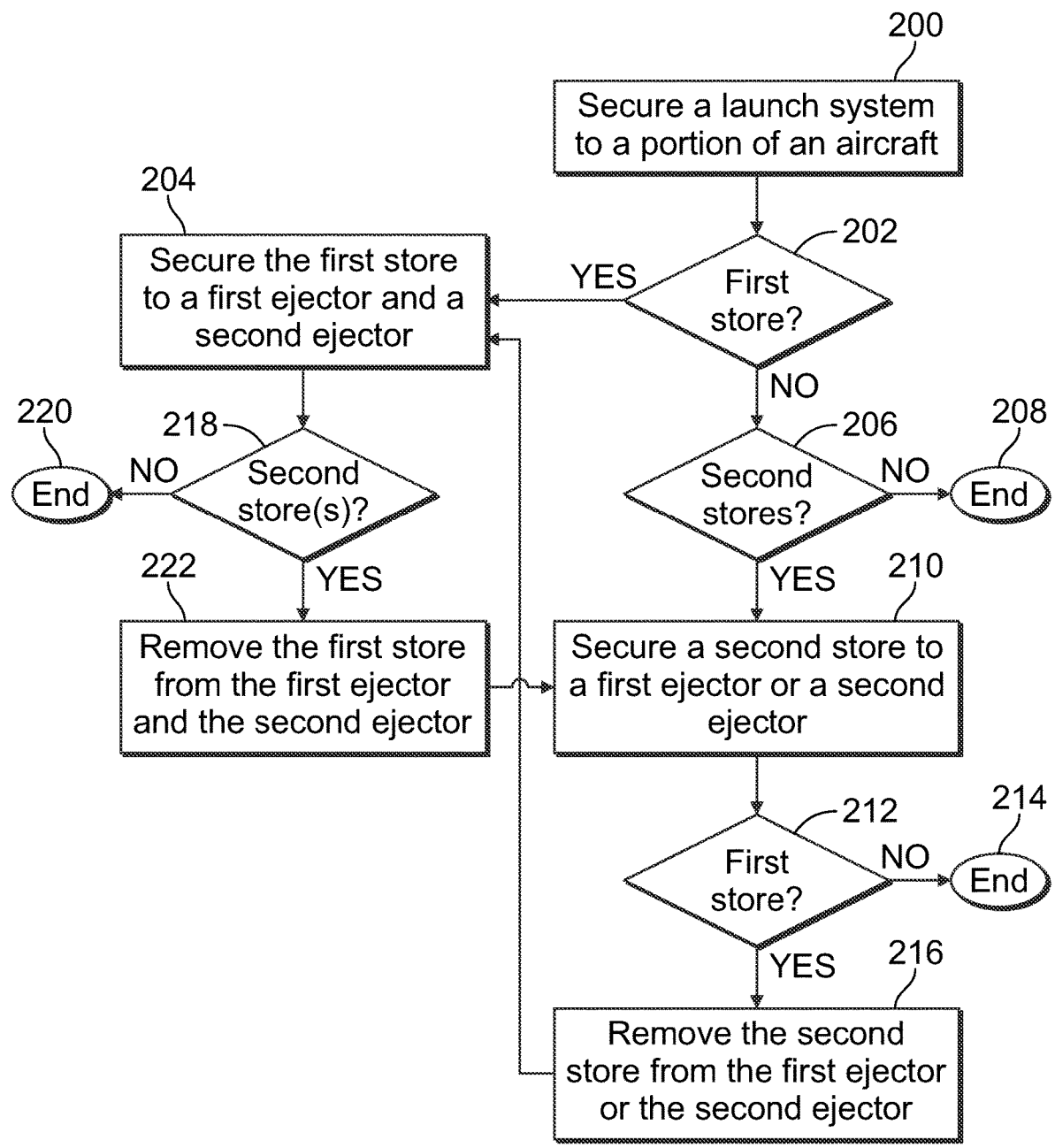
FIG. 2 illustrates a flow chart of a method, according to an example of the present disclosure.

FIG. 2 illustrates a flow chart of a method, according to an example of the present disclosure. Referring to FIGS. 1 and 2, at 200, the launch system 100 is secured to a portion of the aircraft 102, such as to a lower surface of a wing or fuselage. At 202, it is determined if a first store 104 is to be releasably secured to the launch system 100. If so, the method proceeds to 204, at which the first store 104 is secured to both the first ejector 112 and the second ejector 114.

If, however, a first store 104 is not to be secured to the launch system 100 at 202, the method proceeds to 206, at which it is determined if one or more second stores 106 are to be secured to the launch system 100. If not, the method ends at 208.

If, however, one or more second stores 106 are to be secured to the launch system 100, the method proceeds from 206 to 210, at which a second store 106 is secured to the first ejector 112 or the second ejector 114. In at least one example, one (such as a first) second store 106 is secured to the first ejector 112, and another (such as a second) second store 106 is secured to the second ejector 114.

At 212, it is then determined if a first store 212 is to be secured to the launch system 100. If not, the method ends at 214.

If, however, a first store 212 is to be secured to the launch system 100, the method proceed from 212 to 216, at which the second store(s) 106 are removed from the first ejector 112 and the second ejector 114. The method then return to 204, at which the first store 104 is secured to the first ejector 112 and the second ejector 114.

At 218, it is then determined if one or more second stores 106 are to be secured to the launch system 100. If not, the method ends at 220.

If, however, one or more second stores 106 are to be secured to the launch system 100, the method proceeds from 218 to 222, at which the first store 104 is removed from the first ejector 112 and the second ejector 114. The method then proceeds to 210, as described above.

Figure 3:
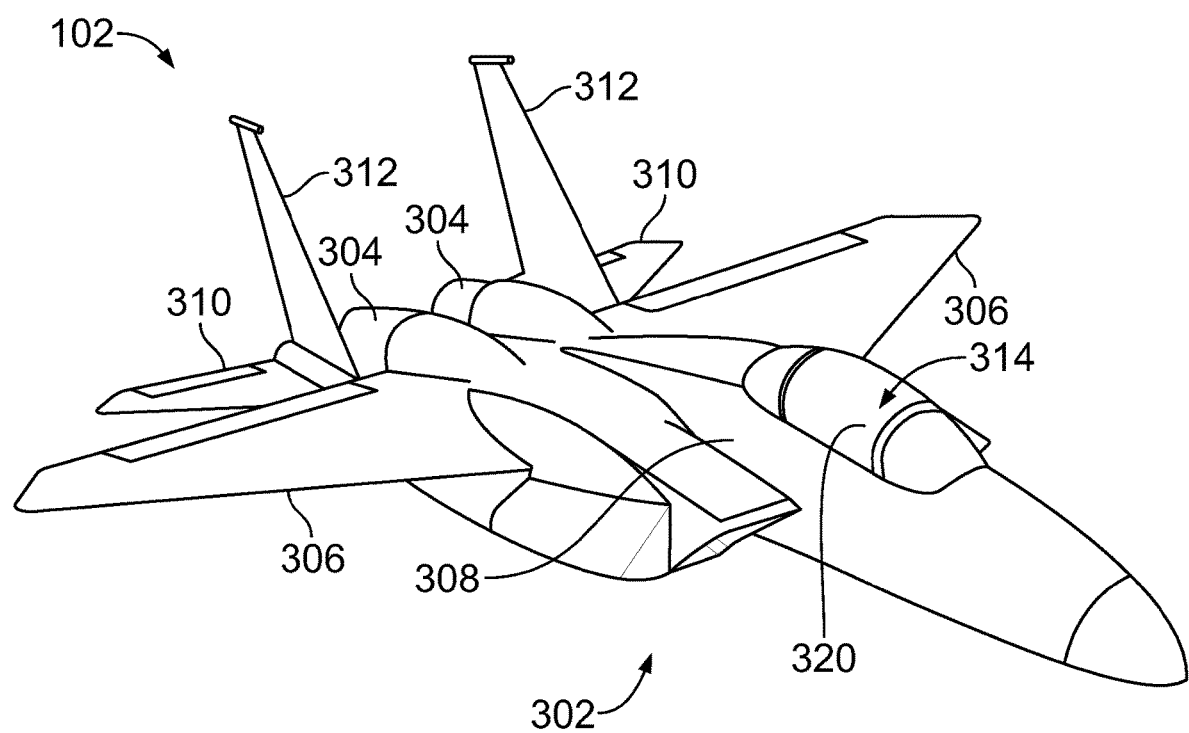
FIG. 3 illustrates a perspective front view of an aircraft, according to an example of the present disclosure.

FIG. 3 illustrates a perspective front view of an aircraft 102, according to an embodiment of the present disclosure. As shown, the aircraft 102 is a military fighter jet. The aircraft 102 includes a propulsion system 302 that includes two engines 304, for example. Optionally, the propulsion system 302 may include more or less engines 304 than shown. The engines 304 are carried by wings 306 and/or a fuselage 308 of the aircraft 102. In other examples, the engines 304 may be carried by other portions of the aircraft 102, such as wings 306. The fuselage 308 also supports horizontal stabilizers 310 and vertical stabilizers 312. The fuselage 308 of the aircraft 102 includes the cockpit 314 covered by a canopy 320. The launch system 100 (shown in FIG. 1) is configured to be secured to a portion of the aircraft 102, such as underneath a wing 306, and/or the fuselage 308. Optionally, the aircraft 102 may be various other types of military aircraft. For example, the aircraft 102 can be a military helicopter.

Figure 4:
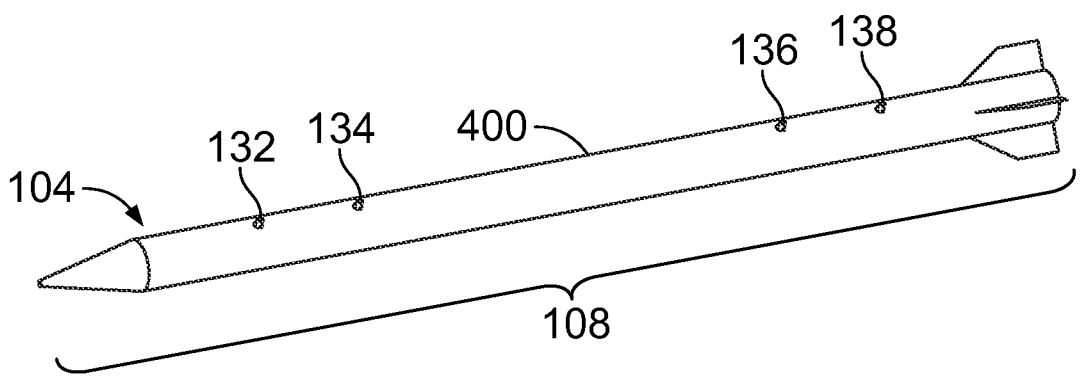
FIG. 4 illustrates a perspective view of a first store, according to an example of the present disclosure.

FIG. 4 illustrates a perspective view of a first store 104, according to an example of the present disclosure. The first store 104 can be a missile, such as an air-to-air or air-to-land missile. Optionally, the first store 104 can be a rocket. As another example, the first store 104 can be a bomb.

The first store 104 includes a main body 400. The first coupler 132, the second coupler 134, the third coupler 136, and the fourth coupler 138 outwardly extend from the main body 400. As shown, the couplers 132, 134, 136, and 138 can be bail lugs.

Figure 5:
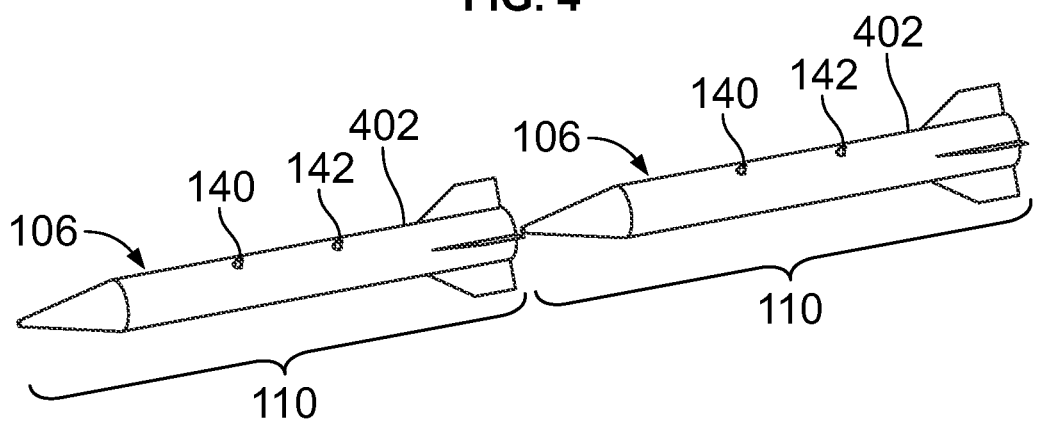
FIG. 5 illustrates a perspective view of second stores, according to an example of the present disclosure.

FIG. 5 illustrates a perspective view of second stores 106, according to an example of the present disclosure. One or both of the second stores 106 can be missiles, such as air-to-air or air-to-land missiles. Optionally, one or both of the second stores 106 can be rockets. As another example, one or both of the second stores 106 can be bombs.

The second stores 106 include main bodies 402. The first couplers 140 and the second couplers 142 outwardly extend from the main bodies 402. As shown, the couplers 140 and 142 can be bail lugs.

Referring to FIGS. 4 and 5, the length 108 of the first store 104 is greater than the lengths 110 of the second stores 106. Stated differently, the lengths 110 of the second stores 106 are less than the length 108 of the first store 104.

Figure 6:
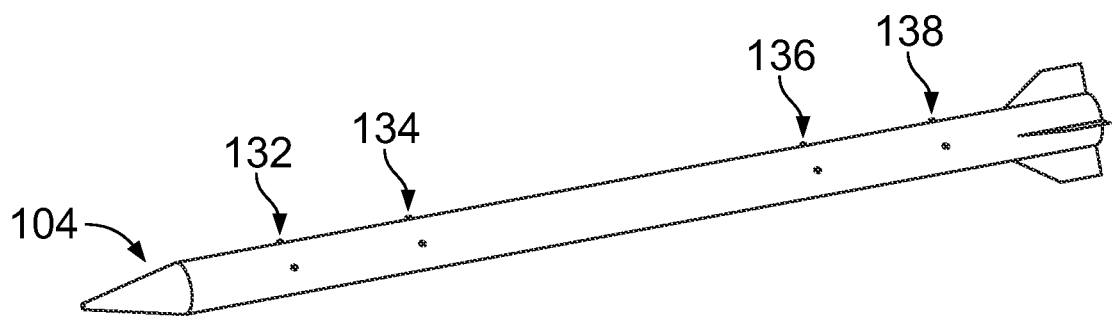
FIG. 6 illustrates a perspective view of a first store, according to an example of the present disclosure.
Figure 7:
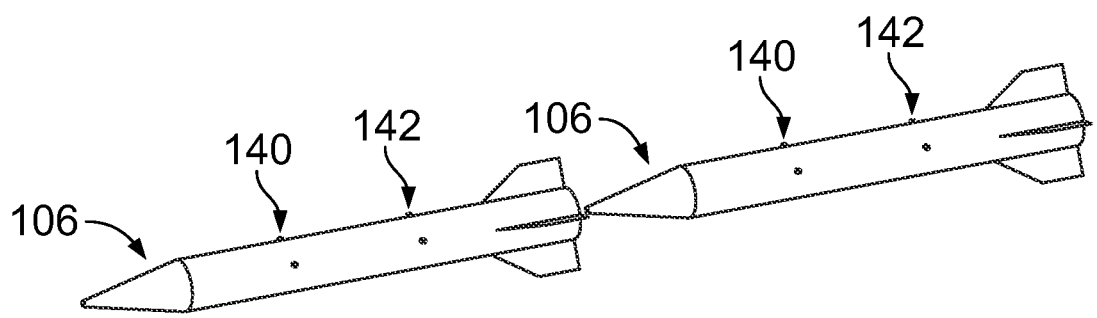
FIG. 7 illustrates a perspective view of second stores, according to an example of the present disclosure.

FIG. 6 illustrates a perspective view of a first store 104, according to an example of the present disclosure. FIG. 7 illustrates a perspective view of second stores 106, according to an example of the present disclosure. Referring to FIGS. 6 and 7, each of the couplers 132, 134, 136, 138, 140, and 142 can be or otherwise include a pair of retention posts.

Figure 8:
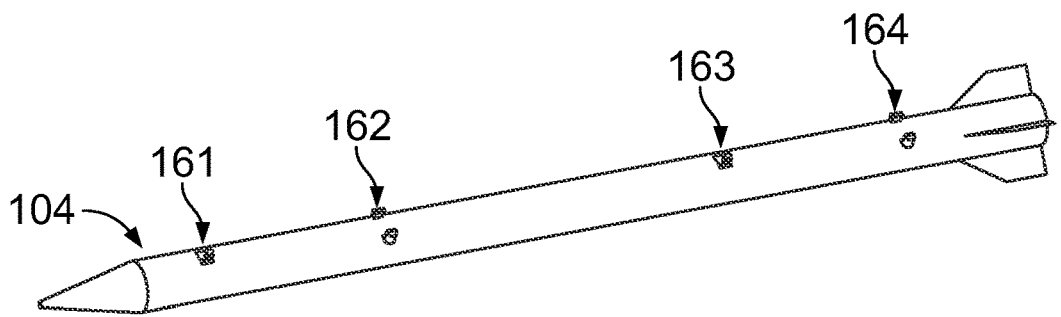
FIG. 8 illustrates a perspective view of a first store, according to an example of the present disclosure.
Figure 9:
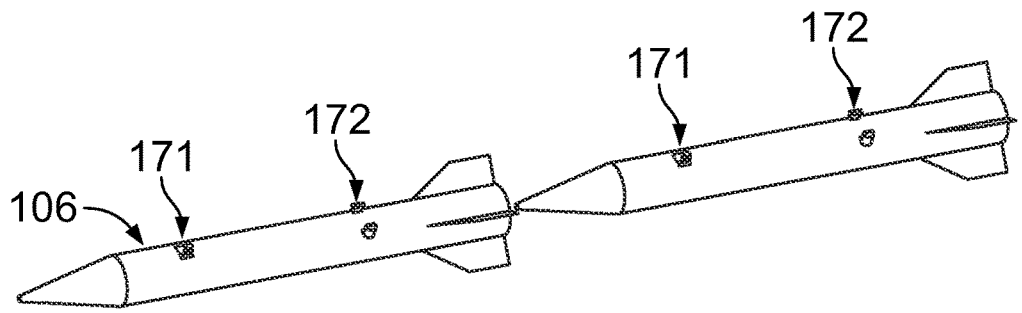
FIG. 9 illustrates a perspective view of second stores, according to an example of the present disclosure.

FIG. 8 illustrates a perspective view of a first store 104, according to an example of the present disclosure. FIG. 9 illustrates a perspective view of second stores 106, according to an example of the present disclosure. Referring to FIGS. 8 and 9, the couplers 161, 162, 163, 164, 171, and 172 can be or otherwise include cooperating hangers.

Figure 10:
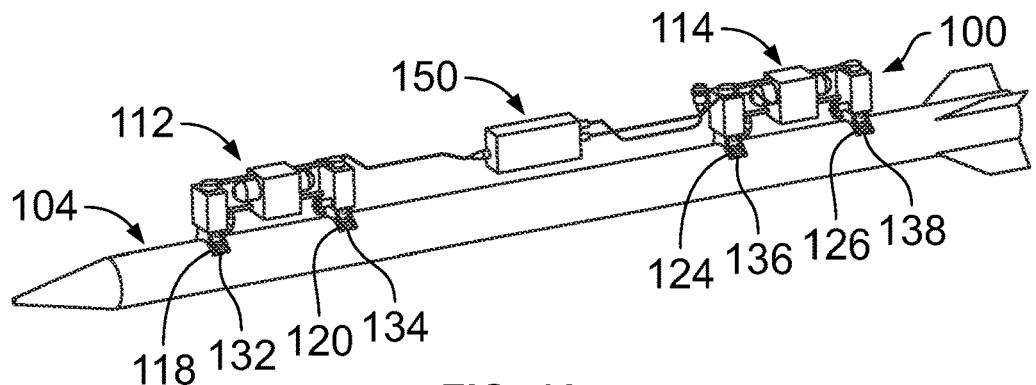
FIG. 10 illustrates a perspective view of a launch system retaining a first store, according to an example of the present disclosure.

FIG. 10 illustrates a perspective view of a launch system 100 retaining a first store 104, according to an example of the present disclosure. As shown, the first ejector 112 retains the first coupler 132 and the second coupler 134 of the first store 104, and the second ejector 114 retains the third coupler 136 and the fourth coupler 138 of the of the first store 104.

Figure 11:
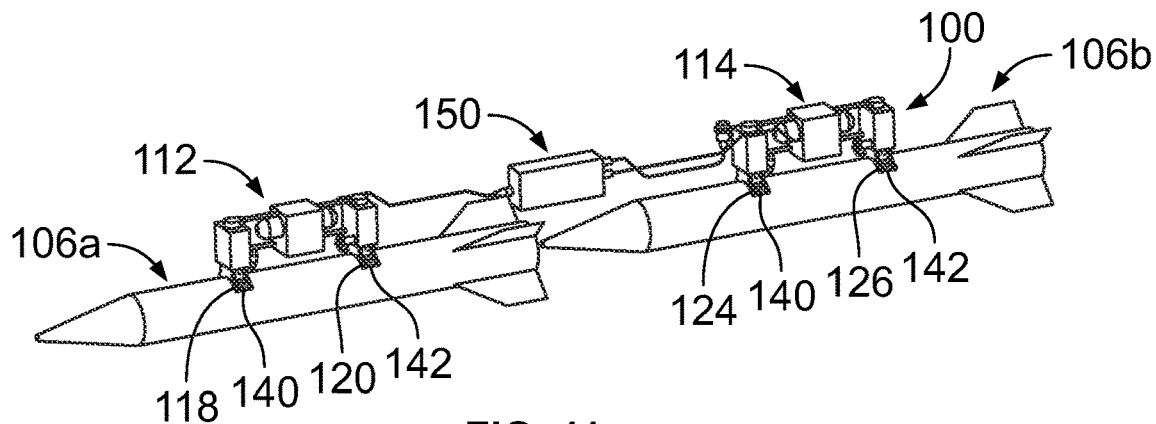
FIG. 11 illustrates a perspective view of the launch system of FIG. 10 retaining separate and distinct second stores, according to an example of the present disclosure.

FIG. 11 illustrates a perspective view of the launch system 100 of FIG. 10 retaining separate and distinct second stores 106a and 106b, according to an example of the present disclosure. The first ejector 112 retains the second store 106a, and the second ejector 112 retains the second store 106b, which his separate and distinct from the second store 106a.

Figure 12:
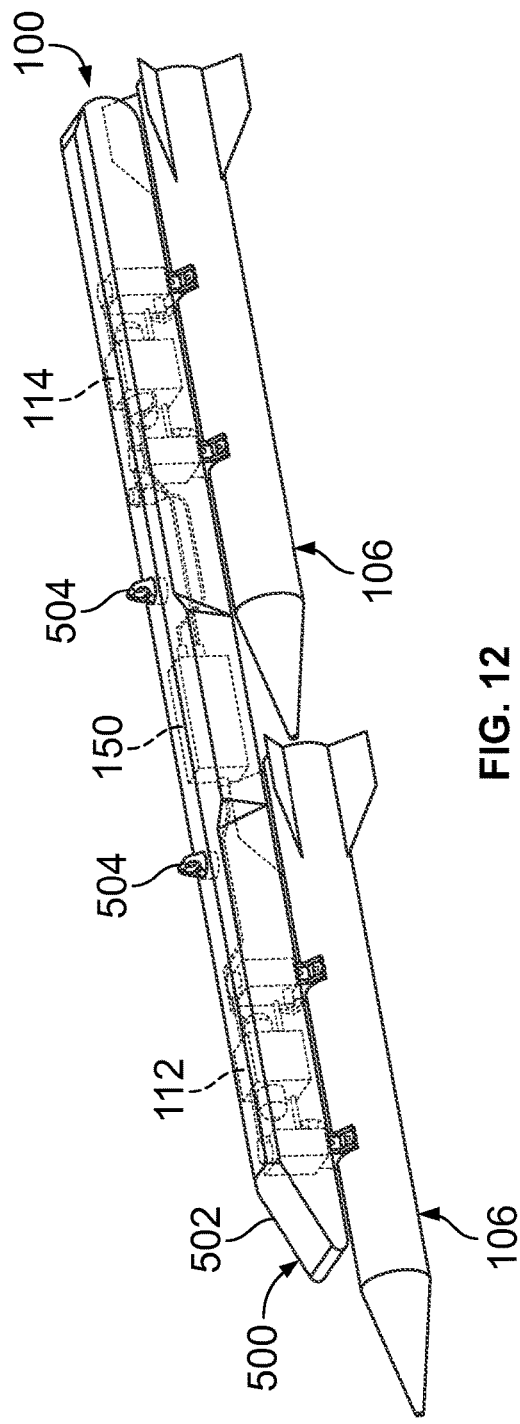
FIG. 12 illustrates a perspective view of a launch system, according to an example of the present disclosure.

FIG. 12 illustrates a perspective view of a launch system 100, according to an example of the present disclosure. In at least one example, the launch system 100 includes a carriage 500 having a housing 502 defining an internal chamber. At least portions of the first ejector 112, the second ejector 114, and the control unit 150 can be secured within the housing 502. One or more lugs 504 outwardly extend from an outer surface of the carriage 500. The lugs 504 are configured to secure to reciprocal features of an aircraft to secure the launch system 100 thereto. Optionally, the launch system 100 may not include a carriage or housing. Instead, the ejectors and control unit can be directly mounted to a portion of an aircraft.

Figure 13:
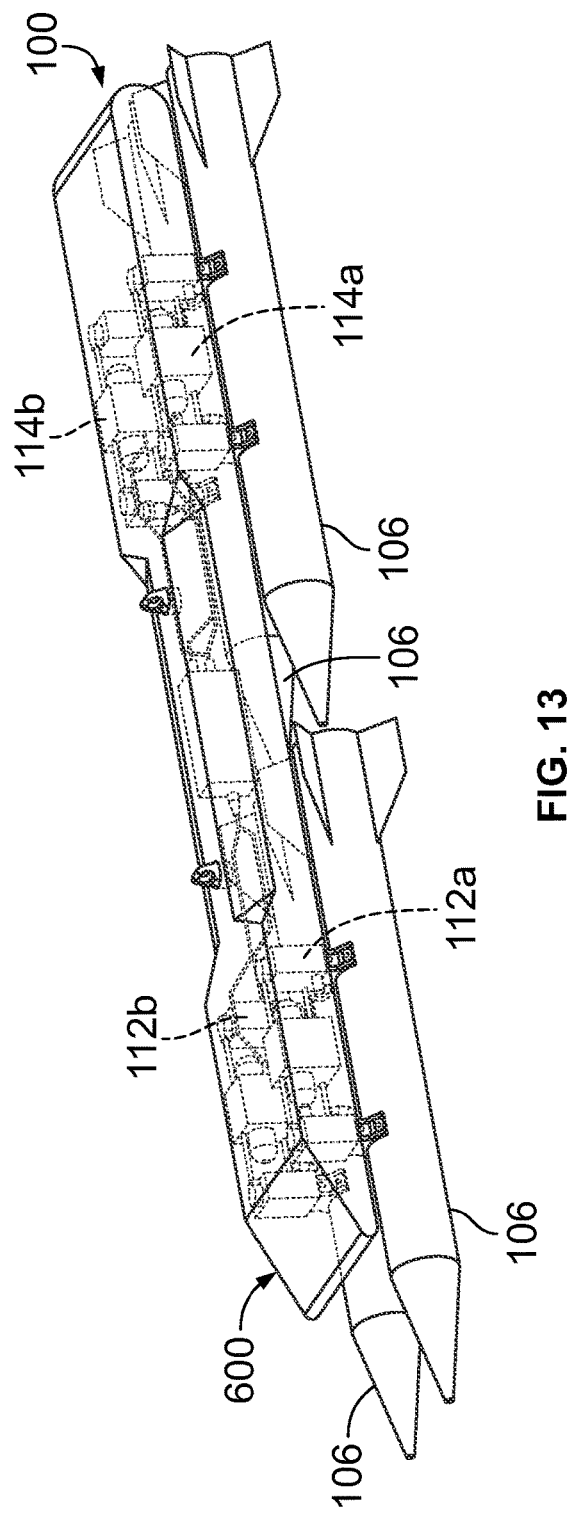
FIG. 13 illustrates a perspective view of a launch system, according to an example of the present disclosure.

FIG. 13 illustrates a perspective view of a launch system 100, according to an example of the present disclosure. In this example, the launch system 100 includes an expanded carriage 600 that retains laterally aligned first ejectors 112a and 112b, and laterally aligned second ejectors 114a and 114b. As such, the launch system 100 can be configured to retain two first stores 104 in a side-by-side manner, or four different second stores 106, as shown.

Further, the disclosure comprises examples according to the following clauses:

Clause 1. A launch system for an aircraft, comprising:
a first ejector; and
a second ejector,
wherein the first ejector and the second ejector are configured to cooperate to releasably retain a first store having a first length, and wherein each of the first ejector and the second ejector is configured to releasably retain a second store having a second length that is less than the first length.

Clause 2. The launch system of Clause 1, wherein the first ejector is configured to releasably retain one second store, and wherein the second ejector is configured to releasably retain another second store.

Clause 3. The launch system of Clauses 1 or 2, wherein the first ejector and the second ejector are configured to allow the first store to be removed from the first ejector and the second ejector, and replaced with one or more of the second stores, and wherein the first ejector and the second ejector are further configured to allow the one or more second stores to be removed and replaced with the first store.

Clause 4. The launch system of any of Clauses 1-3, wherein the first ejector comprises a first securing interface having a first retainer and a second retainer, and wherein the second ejector comprises a second securing interface having a third retainer and a fourth retainer.

Clause 5. The launch system of Clause 4, wherein the first store is releasably retained by the first retainer, the second retainer, the third retainer, and the fourth retainer, and wherein the second store is releasably retained by only the first retainer and the second retainer, or the third retainer and the fourth retainer.

Clause 6. The launch system of Clauses 4 or 5, wherein the first retainer, the second retainer, the third retainer, and the fourth retainer are linearly aligned.

Clause 7. The launch system of any of Clauses 4-6, wherein the first store comprises:
a first coupler releasably retained by the first retainer;
a second coupler releasably retained by the second retainer;
a third coupler releasably retained by the third retainer; and
a fourth coupler releasably retained by the fourth retainer.

Clause 8. The launch system of any of Clauses 4-7, wherein the second store comprises:
a first coupler releasably retained by one of the first retainer or the third retainer; and
a second coupler releasably retained by one of the second retainer or the fourth retainer.

Clause 9. The launch system of any of Clauses 1-8, further comprising a control unit configured to operate the first ejector and the second ejector to launch the first store and the second store.

Clause 10. The launch system of Clause 9, wherein the control unit is configured to operate both the first ejector and the second ejector to launch the first store, and wherein the control unit is further configured to operate one of the first ejector or the second ejector to launch the second store.

Clause 11. The launch system of any of Clauses 1-10, further comprising a carriage configured to secure the launch system to the aircraft.

Clause 12. A launch method for an aircraft, comprising:
releasably retaining a first store having a first length by a first ejector and a second ejector; and
releasably retaining a second store having a second length that is less than the first length with the first ejector or the second ejector.

Clause 13. The launch method of Clause 12, further comprising releasably retaining another second store with the other of the first ejector or the second ejector.

Clause 14. The launch method of Clauses 12 or 13, further comprising:
removing the first store from the first ejector and the second ejector;
replacing the first store with one or more of the second stores; and
removing the one or more second stores from one or both of the first ejector and the second ejector; and
replacing the one or more second stores with the first store.

Clause 15. The launch method of any of Clauses 12-14, further comprising operating, by a control unit, the first ejector and the second ejector to launch the first store and the second store.

Clause 16. The launch method of Clause 15, wherein said operating comprises:
operating both the first ejector and the second ejector to launch the first store; and
operating one of the first ejector or the second ejector to launch the second store.

Clause 17. An aircraft comprising:
a launch system including:
a first ejector; and
a second ejector,
wherein the first ejector and the second ejector are configured to cooperate to releasably retain a first store having a first length, wherein the first ejector is configured to releasably retain a second store having a second length that is less than the first length, and wherein the second ejector is configured to releasably retain another second store having the second length,
wherein the first ejector and the second ejector are configured to allow the first store to be removed from the first ejector and the second ejector, and replaced with the second stores, and wherein the first ejector and the second ejector are further configured to allow the second stores to be removed and replaced with the first store.

Clause 18. The aircraft of Clause 17, wherein the first ejector comprises a first securing interface having a first retainer and a second retainer, wherein the second ejector comprises a second securing interface having a third retainer and a fourth retainer, and wherein the first retainer, the second retainer, the third retainer, and the fourth retainer are linearly aligned.

Clause 19. The aircraft of Clause 18, wherein the first store is releasably retained by the first retainer, the second retainer, the third retainer, and the fourth retainer, wherein one of the second stores is releasably retained by only the first retainer and the second retainer, and wherein the other of the second stores is releasably retained by only the third retainer and the fourth retainer.

Clause 20. The aircraft of any of Clauses 17-19, wherein the launch system further comprises a control unit configured to operate the first ejector and the second ejector to launch the first store and the second store, wherein the control unit is configured to operate both the first ejector and the second ejector to launch the first store, and wherein the control unit is further configured to operate one of the first ejector or the second ejector to launch the second store.

As described herein, examples of the present disclosure provide systems and methods for interchanging different stores in relation to a single launch system. Further, examples of the present disclosure provide adaptable and interchangeable launch systems and methods configured to releasably retain different types of stores.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A launch system for an aircraft, comprising:
   a first ejector; and
   a second ejector,
   wherein the first ejector and the second ejector are configured to cooperate to releasably retain a first store having a first length, and wherein each of the first ejector and the second ejector is configured to releasably retain a second store having a second length that is less than the first length.

2. The launch system of claim 1, wherein the first ejector is configured to releasably retain one second store, and wherein the second ejector is configured to releasably retain another second store.

3. The launch system of claim 1, wherein the first ejector and the second ejector are configured to allow the first store to be removed from the first ejector and the second ejector, and replaced with one or more of the second stores, and wherein the first ejector and the second ejector are further configured to allow the one or more second stores to be removed and replaced with the first store.

4. The launch system of claim 1, wherein the first ejector comprises a first securing interface having a first retainer and a second retainer, and wherein the second ejector comprises a second securing interface having a third retainer and a fourth retainer.

5. The launch system of claim 4, wherein the first store is releasably retained by the first retainer, the second retainer, the third retainer, and the fourth retainer, and wherein the second store is releasably retained by only the first retainer and the second retainer, or the third retainer and the fourth retainer.

6. The launch system of claim 4, wherein the first retainer, the second retainer, the third retainer, and the fourth retainer are linearly aligned.

7. The launch system of claim 4, wherein the first store comprises:
   a first coupler releasably retained by the first retainer;
   a second coupler releasably retained by the second retainer;
   a third coupler releasably retained by the third retainer; and
   a fourth coupler releasably retained by the fourth retainer.

8. The launch system of claim 4, wherein the second store comprises:
   a first coupler releasably retained by one of the first retainer or the third retainer; and
   a second coupler releasably retained by one of the second retainer or the fourth retainer.

9. The launch system of claim 1, further comprising a control unit configured to operate the first ejector and the second ejector to launch the first store and the second store.

10. The launch system of claim 9, wherein the control unit is configured to operate both the first ejector and the second ejector to launch the first store, and wherein the control unit is further configured to operate one of the first ejector or the second ejector to launch the second store.

11. The launch system of claim 1, further comprising a carriage configured to secure the launch system to the aircraft.

12. A launch method for an aircraft, comprising:
  releasably retaining a first store having a first length by a first ejector and a second ejector; and
  releasably retaining a second store having a second length that is less than the first length with the first ejector or the second ejector.

13. The launch method of claim 12, further comprising releasably retaining another second store with the other of the first ejector or the second ejector.

14. The launch method of claim 12, further comprising:
  removing the first store from the first ejector and the second ejector;
  replacing the first store with one or more of the second stores; and
  removing the one or more second stores from one or both of the first ejector and the second ejector; and
  replacing the one or more second stores with the first store.

15. The launch method of claim 12, further comprising operating, by a control unit, the first ejector and the second ejector to launch the first store and the second store.

16. The launch method of claim 15, wherein said operating comprises:
  operating both the first ejector and the second ejector to launch the first store; and
  operating one of the first ejector or the second ejector to launch the second store.

17. An aircraft comprising:
  a launch system including:
    a first ejector; and
    a second ejector,
    wherein the first ejector and the second ejector are configured to cooperate to releasably retain a first store having a first length, wherein the first ejector is configured to releasably retain a second store having a second length that is less than the first length, and wherein the second ejector is configured to releasably retain another second store having the second length,
    wherein the first ejector and the second ejector are configured to allow the first store to be removed from the first ejector and the second ejector, and replaced with the second stores, and wherein the first ejector and the second ejector are further configured to allow the second stores to be removed and replaced with the first store.

18. The aircraft of claim 17, wherein the first ejector comprises a first securing interface having a first retainer and a second retainer, wherein the second ejector comprises a second securing interface having a third retainer and a fourth retainer, and wherein the first retainer, the second retainer, the third retainer, and the fourth retainer are linearly aligned.

19. The aircraft of claim 18, wherein the first store is releasably retained by the first retainer, the second retainer, the third retainer, and the fourth retainer, wherein one of the second stores is releasably retained by only the first retainer and the second retainer, and wherein the other of the second stores is releasably retained by only the third retainer and the fourth retainer.

20. The aircraft of claim 17, wherein the launch system further comprises a control unit configured to operate the first ejector and the second ejector to launch the first store and the second store, wherein the control unit is configured to operate both the first ejector and the second ejector to launch the first store, and wherein the control unit is further configured to operate one of the first ejector or the second ejector to launch the second store.

* * * * *